(12) United States Patent
Hall et al.

(10) Patent No.: US 12,151,655 B2
(45) Date of Patent: Nov. 26, 2024

(54) LOOSE WHEEL DETECTION

(71) Applicant: NIRA DYNAMICS AB, Linkoping (SE)

(72) Inventors: Andreas Hall, Linkoping (SE); Robert Johansson, Linkoping (SE); Martin Lilja, Linkoping (SE); Gustav Lindmark, Linkoping (SE); Peter Lindskog, Linkoping (SE); Thomas Svantesson, Linkoping (SE)

(73) Assignee: NIRA DYNAMICS AB, Linkoping (SE)

( * ) Notice: Subject to any disclaimer, the term of this patent is extended or adjusted under 35 U.S.C. 154(b) by 1618 days.

(21) Appl. No.: 15/547,051

(22) PCT Filed: Jan. 25, 2016

(86) PCT No.: PCT/EP2016/025003
§ 371 (c)(1),
(2) Date: Jul. 27, 2017

(87) PCT Pub. No.: WO2016/120019
PCT Pub. Date: Aug. 4, 2016

(65) Prior Publication Data
US 2018/0009429 A1   Jan. 11, 2018

(30) Foreign Application Priority Data
Jan. 27, 2015   (DE) .......................... 102015000998.2

(51) Int. Cl.
*B60T 17/22*   (2006.01)
*B60T 8/88*   (2006.01)
*B60W 40/12*   (2012.01)

(52) U.S. Cl.
CPC .............. *B60T 17/22* (2013.01); *B60T 8/885* (2013.01); *B60T 2270/406* (2013.01); *B60T 2270/416* (2013.01)

(58) Field of Classification Search
CPC ........... B60T 17/22; B60T 8/88; B60T 8/885; B60W 40/12; G01M 17/013; G01M 7/02; B60C 23/02
(Continued)

(56) References Cited

U.S. PATENT DOCUMENTS 3,741,176 A * 6/1973 Schmidt .................... F01L 9/04
   123/352
3,802,529 A * 4/1974 Burckhardt ............. B60T 8/175
   180/197

(Continued)

FOREIGN PATENT DOCUMENTS

CA   2 195 608 A1   7/1998
DE   10153072 A1   5/2003
(Continued)

OTHER PUBLICATIONS

PCT International Search Report for PCT Counterpart Application No. PCT/EP2016/025003, 4 pgs. (dated Apr. 12, 2016).
(Continued)

*Primary Examiner* — Tan Q Nguyen
(74) *Attorney, Agent, or Firm* — WOMBLE BOND DICKINSON (US) LLP

(57) ABSTRACT

The disclosed invention makes use of a wheel speed signal to detect a wheel anomaly such as a loose wheel or a wheel with zero pressure. The wheel speed signal is used as a basis to determine a first and a second detection signal. A further basis for determining the first and second detection signals are a first and second reference signal, respectively. The anomaly of e.g. a loose wheel is detected, according to the
(Continued)

teaching of the invention if at least one of the detection signals exceeds a threshold. In particular, the disclosure relates to methods, systems and computer program products to achieve the mentioned objective.

12 Claims, 4 Drawing Sheets

(58) Field of Classification Search
USPC .......................................................... 701/70
See application file for complete search history.

(56) References Cited

U.S. PATENT DOCUMENTS

| 2003/0080857 | A1 | 5/2003 | Bernd et al. |
| 2007/0124053 | A1* | 5/2007 | Lindskog ................ B60T 8/172 |
| | | | 701/72 |
| 2007/0299573 | A1 | 12/2007 | Carlstrom |
| 2008/0243327 | A1 | 10/2008 | Bujak et al. |
| 2016/0163131 | A1 | 6/2016 | Steinlechner et al. |

FOREIGN PATENT DOCUMENTS

| DE | 102013211697 A1 | 12/2014 |
| JP | 2006 115588 A | 4/2006 |
| JP | 2011080947 A | 4/2011 |
| WO | WO 98/31983 A1 | 7/1998 |

OTHER PUBLICATIONS

PCT Written Opinion Report for PCT Counterpart Application No. PCT/EP2016/025003, 7 pgs. (dated Apr. 12, 2016).

International Preliminary Report on Patentability of counterpart Application No. PCT/EP2016/025003, International Bureau of WIPO, 8 pages (dated Aug. 1, 2017).

* cited by examiner

LOOSE WHEEL DETECTION

CROSS-REFERENCE TO RELATED APPLICATIONS

This patent application is a U.S. National Phase Application under 35 U.S.C. § 371 of International Application No. PCT/EP2016/025003, tiled Jan. 25, 2016, entitled LOOSE WHEEL DETECTION, which claims priority to German Patent Application No. 102015000998.2, filed Jan. 27, 2015.

TECHNICAL FIELD

The present invention disclosure generally relates to the area of detecting wheel anomalies of a vehicle, and for example to methods, systems and computer program products for detecting a loose wheel or a wheel with zero pressure.

BACKGROUND OF THE INVENTION

Modern vehicles comprise a variety of sensors and systems to provide the driver and other traffic participants with safety, comfort and information.

These systems include Traction Control System (TCS), Electronic Stability Program (ESP), active suspension system or Anti-lock Braking System (ABS). Besides these active control systems there also exist vehicle driver safety information systems such as road friction indicators and sensor-free tire pressure monitoring system, e.g. indirect Tire Pressure Monitoring Systems (iTPMS), which present information about the driving condition to the driver.

All the above-mentioned systems benefit from the knowledge about a large set of estimated or measured vehicle properties parameters such as, but not limited to, tire longitudinal stiffness, ambient temperature, wheel resonance frequency, carried vehicle load, tire radius change while cornering and wheel vibration dependent on speed.

Knowledge about wheel conditions is of interest. Wheel condition information, e.g., about low pressure, can be useful for detecting wheel anomalies that, when left unreported, can cause wear of vehicles, lesser driving comfort and vehicle controllability, or even an accident.

Particularly, a wheel condition being highly relevant with respect to safety is a wheel that is not properly fixed to an axle of a vehicle, i.e. a loose wheel. Known approaches for detection of a loose wheel require personally inspection and/or use of additional components. For example, it is known to detect a loose wheel include optical indicators placed in a predefined orientation on wheel nuts used to fix a wheel to the threads of a vehicle axle. In the case the wheel loosens, one or more of the optical indicators are not in the predefined orientation, what optically indicates that the wheel is loose. For loose wheel detection, it is also known to secure a sensor assembly to a mounting hub of an axle of a vehicle. The sensor detects relative movement between the hub and the wheel and, in the case, the wheel loosens, emits a signal indicating that the wheel is loose.

OBJECT OF THE INVENTION

In order to overcome shortcoming of known approaches, particularly of the kind mentioned above, an object of the present invention is to provide solution for detection of a loose wheel of a vehicle obviating the need for personal inspection and additional components.

SUMMARY OF THE INVENTION

Generally, the invention makes use of a wheel speed signal to detect a loose wheel. The wheel speed signal is used as a basis to determine a first detection signal and a second detection signal. A further basis for determining the first and second detection signals are a first reference signal associated to the first detection signal and second reference signal associated to the second detection signal. The anomaly of a loose wheel is detected, according to the teaching of the invention, if at least one of the detection signals exceeds its associated threshold. In particular, the disclosure relates to methods, systems and computer program products to achieve the mentioned objective.

SHORT DESCRIPTION OF THE DRAWINGS

FIG. 1a schematically shows a wheel speed sensor comprised of a segmented rotary element and a sensor element.

DETAILED DESCRIPTION OF PREFERRED EMBODIMENTS

The present invention makes use of a wheel speed signal, which is indicative of the wheel speed of a wheel of a vehicle. This is advantageous in the sense that no additional sensors are needed in most vehicles.

The wheel speed signal is used to determine whether a wheel is loose. According to the teaching of the present invention, detection signals can be determined on the basis of the wheel speed signal, which allow for determining whether the wheel is loose.

The preferred embodiments, which will be described in the following can serve to exemplify the teaching of the present invention.

Figure 1A:
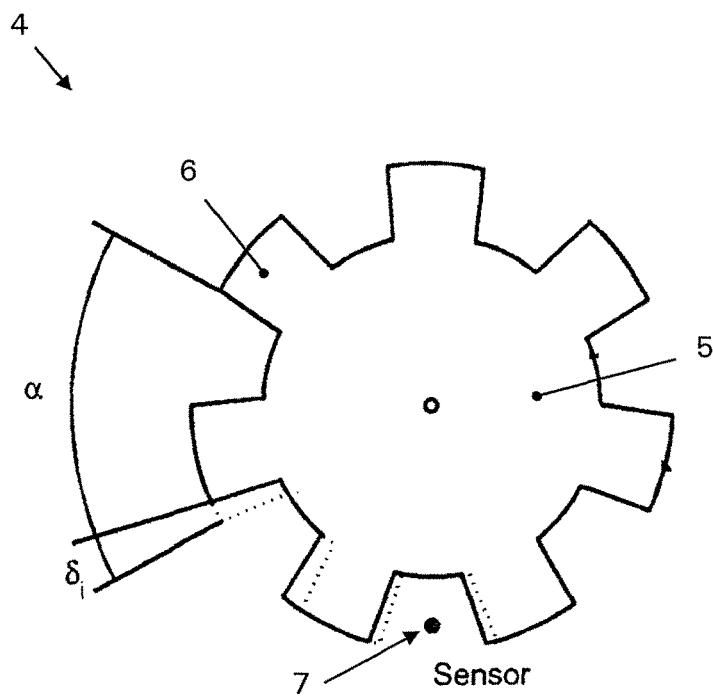
FIG. 1b shows a diagram representing a wheel speed signal as a function of the sample number.

A wheel speed signal is obtained as an input. This wheel speed signal can be obtained in the form of a series of time points t(n) from a segmented wheel speed sensor. An embodiment of a wheel speed sensor is shown in FIG. 1. The wheel speed sensor shown is of the segmented rotary type. The exemplary wheel speed sensor 4 comprises a toothed wheel 5. In the illustrated embodiment, the wheel is shown with seven identical teeth. In practice, such wheels can have a different number of teeth, e.g. 48 teeth. The toothed wheel may be referred to as segmented rotary element with seven identical segments. A sensor component 7 is located and arranged such as to generate a sensor signal whenever a tooth (cog) of the toothed wheel passes the sensor component 7. The sensor component 7 may be an optical sensor, a magnetic sensor (e.g. a HALL sensor) or any other conceivable type of sensor. The sensor component 7 produces electrical signals, which are transported by wires or radio transmission to a subsequent processor or evaluator unit for further processing. In the example of FIG. 2, there are in total seven sensor signals generated during one complete revolution of the toothed wheel.

Variations of the wheel speed signal can occur for various reasons. These reasons include acceleration or deceleration by the driver. However, fluctuations or oscillations of the wheel speed signal can also be due to other reasons. One of these reasons can be a loose wheel or a wheel with zero pressure. This fact is used according to the teaching of the invention.

The wheel speed sensor of a vehicle is typically not an ideal sensor. An ideal sensor would comprise teeth of identical dimensions. In FIG. 1, these dimensions are represented by the angle spacing $\alpha$. For example, in the shown case of seven teeth, $\alpha=360°/7$. However, due to manufacturing or wear, each tooth can deviate from the ideal angle spacing $\alpha$. In the following, the deviations $\delta$ from the ideal angle spacing are called imperfection errors and it is assumed that each of the teeth of the rotary element has its own characterising imperfection error $\delta_l$ (l=1, . . . , L).

Thus, the occurrence of a sensor signal indicates that the rotary element 5 has rotated around an angle of $\alpha=2\pi/L$, in the ideal case of no imperfection errors, and around an angle of $\alpha+\delta_l$, in the realistic case with imperfection errors. From these sensor signals representing time instances t(n) a corresponding wheel speed value $\omega(n)$ can be derived via the relation $$\omega(n) = \frac{\alpha + \delta_l}{t(n) - t(n-1)} \quad \text{(Eq. 1)}$$

wherein a high value of $\omega(n)$ indicates a fast rotating wheel and a low value of $\omega(n)$ is indicative of a slowly rotating wheel. Besides, an estimation value for the vehicle velocity can be obtained by relating the wheel speed $\omega(n)$ to the corresponding tire radius. In the following embodiments, the values t(n), $\Delta t(n)$ and $\omega(n)$, for simplification, are all denoted as wheel speed signals and are considered as originating from the wheel speed sensor 4.

The signal values of signals t(n), $\Delta t(n)$ or $\omega(n)$ are in general distributed non-equidistantly in time. By interpolation, these signals can be converted from the event domain to the time domain. For instance, embodiments for signal processing of discretized input signals of this or similar types are disclosed in PCT/EP2002/012409 of the same applicant. The content of this document is incorporated into the present description by reference.

Figure 1B:
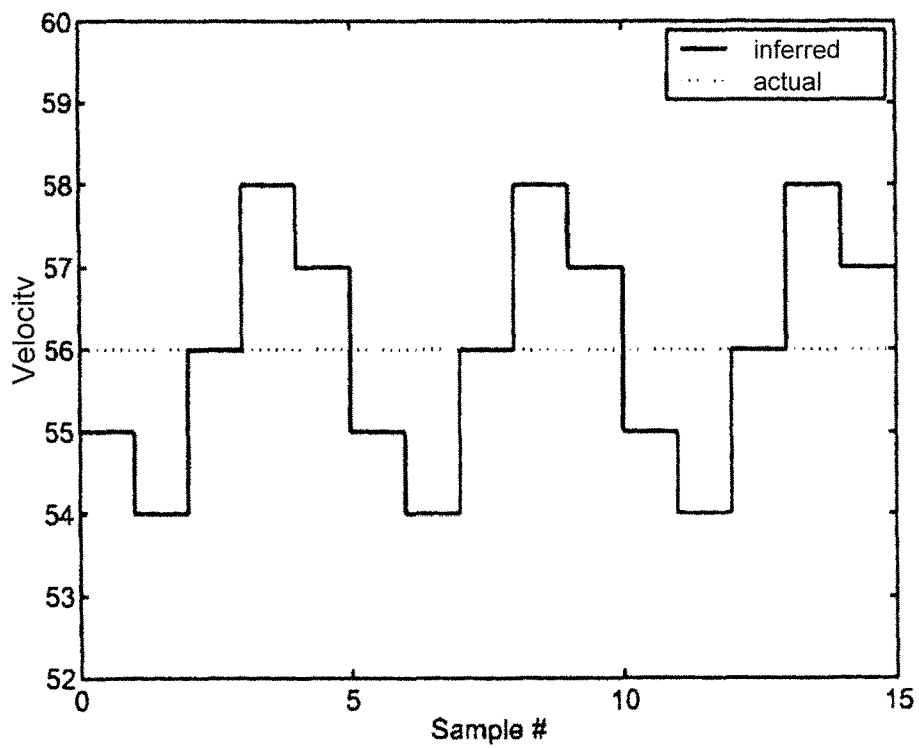
Figure 2:
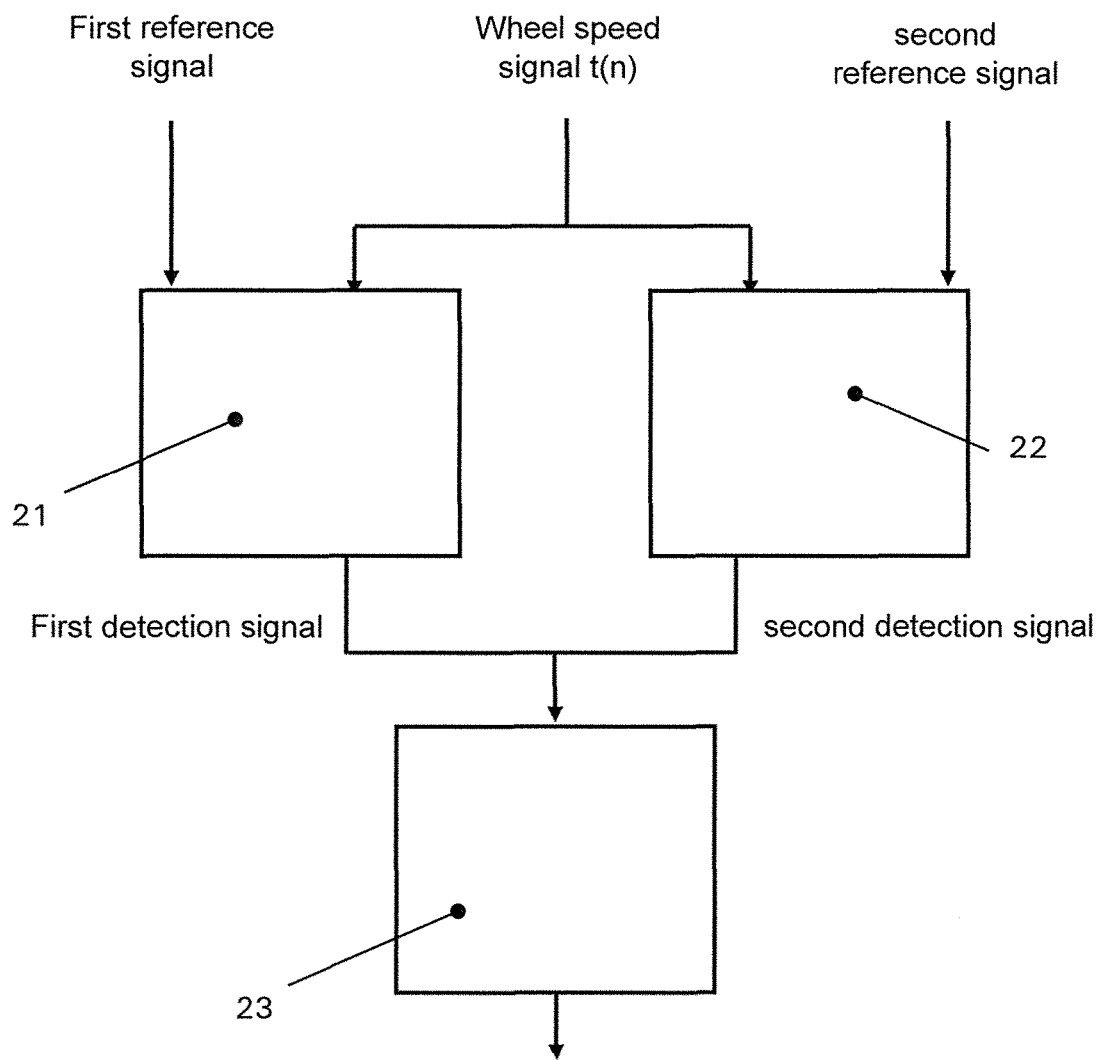
FIG. 2 is a flow diagram of a method according to embodiments.
Figure 4:
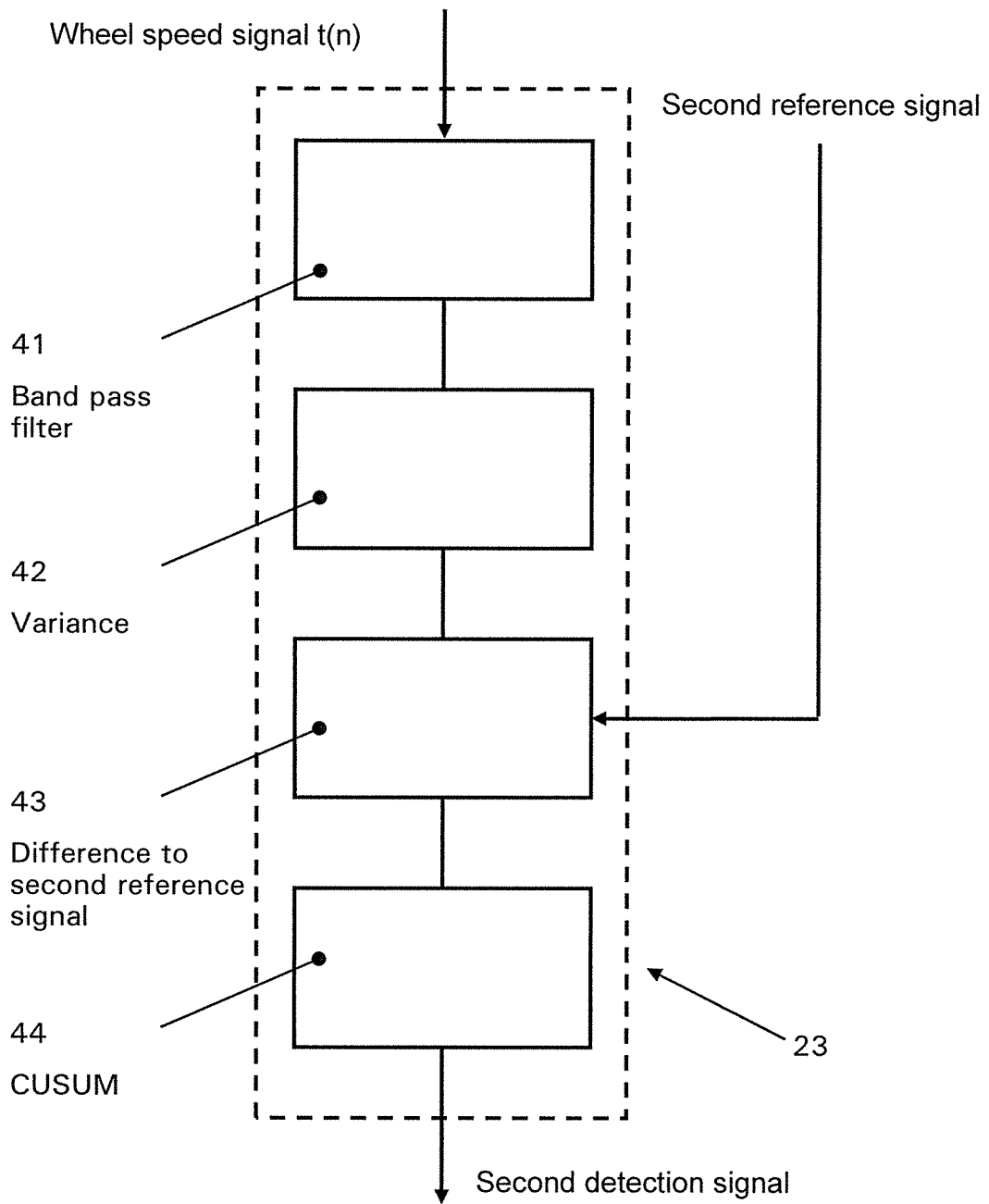
FIG. 4 is a flow diagram of an example sub-step of determining the second detection signal.

FIG. 1b shows a time series of wheel speeds inferred from a wheel speed sensor with imperfections for the case of an actually constant velocity and no imperfection correction. In an idealised way and neglecting the influence of external factors such as a loose wheel, the impact of the sensor imperfections of a wheel speed sensor on the obtained wheel speed signal $\omega(n)$ is exemplified. The diagram of FIG. 4 shows the wheel speed values $\omega(n)$ as a function of the sample number n. There are 15 samples n=1, . . . , 15 shown in the diagram which correspond to three complete revolutions of a rotary element 5 comprising L=5 teeth 6 in total. FIG. 1b represents the case of a car driving with exactly constant velocity v, wherein the dotted curve corresponds to the wheel speed signal $\omega(n)$ obtained from a wheel speed sensor 4 having an ideally segmented rotary element 5 and the solid curve corresponds to the case of an unideal segmented rotary element 5 which generates a periodical fluctuation of the wheel speed around the average value of 56 rad/s. The value of 55 rad/s of the first sample corresponds to a tooth which is slightly larger than a nominal tooth thus producing a wheel speed value which is smaller than the expected value of 56 rad/s. The third sample corresponds to a tooth which exactly corresponds to a nominal tooth thus producing the expected value of 56 rad/s. The fourth sample corresponds to a tooth which is smaller than a nominal tooth thus producing a wheel speed which is larger than the nominal value of 56 rad/s. The $5^{th}$ sample corresponds to the last tooth of the rotary element and the $6^{th}$ sample corresponds again to its first tooth. In result, the solid curve of FIG. 1b shows a periodicity of five sample points which corresponds to a complete revolution of the rotary element 5 of the wheel speed sensor 4.

With reference to FIG. 2, a method according to embodiments of the present invention shall highlight the teaching of the invention.

A wheel speed signal indicative of a wheel speed of a wheel of a vehicle is obtained. It can be obtained from a wheel speed sensor. Based on the wheel speed signal, two detection signals are determined. Typically, determining each of the detection signals further takes into account a respective reference signal.

A first detection signal is determined in step 21 based on the wheel speed signal and a first reference signal. The step of determining the first detection signal can comprise one or several of the computing steps, which will be described with reference to FIG. 3 below.

A second detection signal is determined in step 22 based on the wheel speed signal and a second reference signal. The step of determining the second detection signal can comprise one or several of the computing steps, which will be described with reference to FIG. 4 below.

In the embodiment of FIG. 2, determining the presence or absence of e.g. a loose wheel can be done in step 23 by comparing the first and second detection signals to a first and a second detection threshold, respectively. If at least one of the following conditions is met: (a) the first detection signal exceeds the first detection threshold, or (b) the second detection signal exceeds the second detection threshold; then it is determined that the wheel of the vehicle is loose. In other words, if one of the detection signals exceeds its respective detection threshold, then the presence of a loose wheel is detected.

The information regarding the presence of a loose wheel can subsequently be transmitted (not shown). This transmission can occur via an optical or acoustic signal to the driver. It additionally or alternatively can be transmitted electronically to the operating system of the car. Furthermore, it is conceivable that the information is transmitted to a close-by garage, such that a mechanic can be prepared to fasten the wheel. This is particularly advantageous in the context of autonomously driving vehicles.

Figure 3:
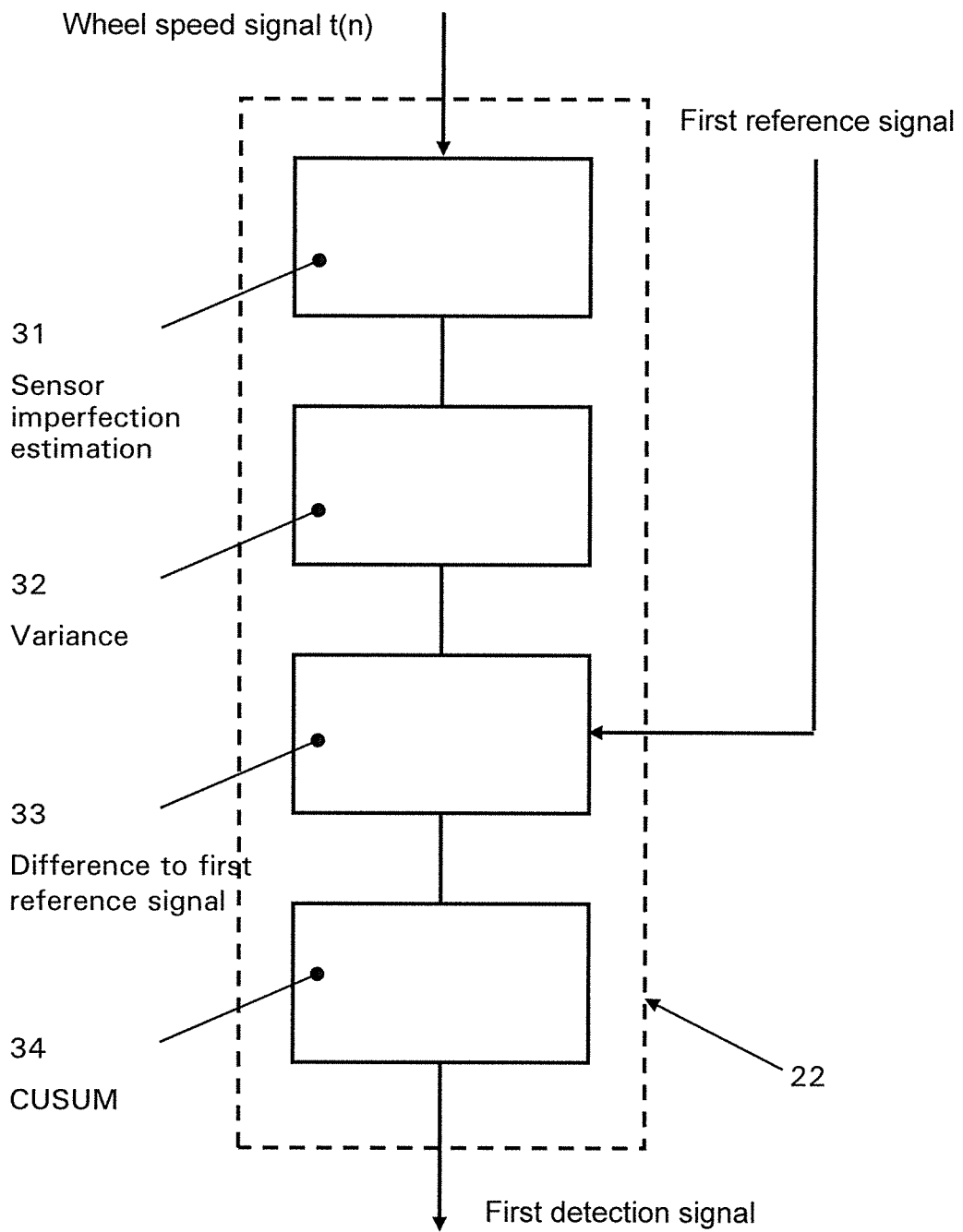
FIG. 3 is a flow diagram of an example sub-step of determining the first detection signal.

FIG. 3 shows an exemplary flow chart for the step of determining a first detection signal, such as step 21 in FIG. 2.

The first detection signal can be determined by estimating an imperfection signal in step 31, indicative of an imperfection of the wheel speed signal as compared to the actual wheel speed of the wheel of the vehicle. One possible source of imperfections is the sensor. Sensor imperfections can be estimated on the basis of a wheel speed signal. The estimation of sensor imperfections is disclosed in US 2007/0124053 A1.

The sensor imperfections values $\delta_l$ of the toothed wheel 5 can be estimated from the wheel speed signal t(n).

The estimated sensor imperfections values $\hat{\delta}_l$ can be computed as weighted average values of sensor imperfection values y(n) of previous n−1 and current revolutions n of the toothed wheel 5.

A weighted average value may for example be obtained by a low pass filter, which is implemented according to the following filter relation:

$$LP: \hat{\delta}_{(n \bmod L)+1} = (1-\mu)\hat{\delta}_{(n \bmod L)+1} + \mu y(n), \quad \text{(Eq. 2)}$$

with $$y(n) = \frac{2\pi}{T_{LAP}(n)}(t(n) - t(n-1)) - \frac{2\pi}{L}, \quad \text{(Eq. 3)}$$

wherein (n mod L)+1 is the number of the tooth 6 of the toothed wheel 5 which corresponds to the sample number n, $\hat{\delta}_{n \bmod L}$ is the estimation value of the corresponding sensor imperfection, $\mu$ is a forgetting factor of the filter, t(n) and t(n−1) are consecutive values of the wheel speed signal, L is the total number of teeth 6 of the toothed wheel 5 and $T_{LAP}(n)$ is the duration of a complete revolution of the toothed wheel 5.

If an imperfection signal was estimated, the wheel speed signal may, in some embodiments, be corrected for the imperfections. Thus, an imperfection-corrected wheel speed signal $\varepsilon(n)$ may be computed based on the wheel speed signal t(n) and the sensor imperfection signal $\hat{\delta}_i$. It is important to note, that the imperfection-corrected sensor signal $\varepsilon(n)$ does not necessarily contain values, which represent time instances or rotational speeds or similar quantities. It may also be any other artificial quantity, which can appropriately represent an imperfection-corrected derivative of the wheel speed signal.

In one embodiment, the imperfection-corrected sensor signal $\varepsilon(n)$ is obtained from the relation $$\varepsilon(n) = y(n) - \hat{\delta}_{(n \bmod L)+1} \quad \text{(Eq. 4)}$$

wherein, as for the sensor imperfection estimation above, $$y(n) = \frac{2\pi}{T_{LAP}(n)}(t(n) - t(n-1)) - \frac{2\pi}{L}$$

wherein (n mod L)+1 is the number of the tooth 6 of the rotary element 5 which corresponds to the sample number n, $\hat{\delta}_{(n \bmod L)+1}$ is the estimation value of the corresponding sensor imperfection, $\mu$ is a forgetting factor of the filter, t(n) and t(n−1) are consecutive values of the wheel speed signal, L is the total number of teeth 6 of the rotary element 5 and $T_{LAP}(n)$ is the duration of a complete revolution of the rotary element 5.

Additionally or alternatively, in step 32, a variance can be computed during the determination of the first detection signal. In particular, a variance of the imperfection-corrected wheel speed signal within a finite time window can be computed. This variance of the imperfection-corrected wheel speed signal is indicative of temporal variations of the imperfection-corrected wheel speed signal within the finite time window.

Step 32 of computing a variance may determine a variance $\alpha(n)$ on the basis of the imperfection-corrected sensor signal $\varepsilon(n)$ by using a low pass filter (it should be noted that the term "variance" as used throughout the whole application does not refer to the standard mathematical definition but to an estimation value of the variance). The low pass filter may for example determine the variance $\alpha(n)$ of the imperfection-corrected sensor signal $\varepsilon(n)$ according to the following relation:

$$\alpha(n) = \text{Var}(\varepsilon) = LP(\varepsilon^2) - LP(\varepsilon)^2, \quad \text{(Eq. 5)}$$

wherein $LP(\varepsilon)$ is a low pass filtered value of the imperfection-corrected sensor signal $\varepsilon(n)$, and $LP(\varepsilon^2)$ is a low pass filtered value of the square $\varepsilon^2(n)$ of the imperfection-corrected sensor signal $\varepsilon(n)$.

Here, the low pass filter may be implemented according to the following filter relation:

$$LP: \alpha(n+1) = (1-\lambda)\alpha(n) + \lambda\varepsilon(n), \quad \text{(Eq. 6)}$$

wherein $\alpha$ is an estimation value of the variance $\text{Var}(\varepsilon)$, $\lambda$ is a forgetting factor of the filter, and $\varepsilon(n)$ is the imperfection-corrected sensor signal.

However, even a tightly fastened wheel can yield temporal variations of the imperfection-corrected wheel speed signal. Therefore, the signal is compared to a first reference signal. This comparison can be implemented, inter alia, by computing the difference between the signal and the first reference signal in step 33. In general, subtracting a first reference signal can be advantageous and does not necessarily occur at this step. Alternatively, it can occur at any other step of the method. For instance, by subtracting a reference wheel speed signal from the obtained wheel speed signal, a similar result may be achieved. In some instances, in particular for low reference signals, the subtraction may not be essential and may be skipped.

A loose wheel detection method may be sensitive to loose wheels independently of the degree of looseness. To achieve a sensitivity to detect also slightly loose wheels, the first detection signal can be integrated over time. Determining the first detection signal can comprise computing a first cumulative sum. The first cumulative sum can be computed in step 34 according to the following relation:

$$\text{CUSUMCounter}(n+1) = \min(\max(\text{CUSUMCounter}(n) + \alpha(n) - \text{Drift}, 0), \text{CounterLimit}), \quad \text{(Eq. 7)}$$

wherein $\alpha(n)$ is an input signal to be added cumulatively, preferentially the difference of signals or variances of the sensor imperfection signal, and Drift and CounterLimit are tuning parameters.

Determining the first detection signal can, in a preferred embodiment, include any or all of the above steps.

Furthermore, the method embodiments of the present invention comprise determining a second detection signal. FIG. 4 shows an exemplary flow chart for the step of determining a second detection signal such as step 22 in FIG. 2.

A wheel speed signal serves as input for the step of determining the second detection signal.

On the basis of the wheel speed signal, a band pass filtered wheel speed signal can be computed by band pass filtering the wheel speed signal in step 41.

Furthermore, the step of determining the second detection signal can comprise computing a variance within a finite time window in step 42. In particular, in some embodiments, the variance of the band pass filtered wheel speed signal may be computed. This variance of the band pass filtered wheel speed signal is indicative of temporal variations of the band pass filtered wheel speed signal.

However, even a tightly fastened wheel can yield temporal variations of the band pass filtered wheel speed signal. Typically, these temporal variations of a fastened wheel are smaller than those of a loose wheel. Therefore, the signal is compared to a second reference signal. This comparison can be implemented, inter alia, by computing the difference between the signal and the second reference signal in step 43. In general, subtracting a second reference signal can be advantageous and does not necessarily occur at this step. Alternatively, it can occur at any other step of the method. For instance, by subtracting a reference wheel speed signal from the obtained wheel speed signal, a similar result may be achieved. In some instances, in particular for low reference signals, the subtraction may not be essential and may be skipped.

A loose wheel detection method can be sensitive to loose wheels, independently of the degree of looseness. To achieve a sensitivity to detect also slightly loose wheels, the second detection signal can be integrated over time. Determining the first detection signal can comprise computing a cumulative sum. The cumulative sum can be computed in step 44 according to the following relation:

CUSUMCounter(*n*+1)=min(max(CUSUMCounter (*n*)+α(*n*)−Drift,0),CounterLimit), (Eq. 8)

wherein α(n) is an input signal to be added cumulatively, and Drift and CounterLimit are tuning parameters.

Determining the second detection signal can include in a preferred embodiment, any or all of the above steps.

Determining a detection signal may, as described above with reference to FIGS. 3 and 4, comprise the subtraction of one or more reference signals. The reference signal may be, in some embodiments, a constant over time. This constant may be, for example, determined empirically or may be a design parameter to be chosen by the skilled person or any other suitable constant.

Alternatively, the reference signal may be a signal determined on the basis of a wheel speed signal indicative of a wheel speed of a further wheel of the vehicle. In this embodiment, it is possible to detect a loose wheel if not all wheels are equally loose, i.e. as long as there is one wheel more or less loose than at least on other wheel (even with a very small difference). Theoretically, it seems to be possible that all wheels are equally loose. However, this would be the case for a rather short period of time only. Assuming a moment/situation where all wheels are identically loose, then the bolts of wheels on the left side of a vehicle moving in the forward direction will be unscrewed due to the rotational direction of these wheels, while the bolts of the wheels on the vehicle's right side will not. As a result, at least the loose wheel(s) on the vehicle's left side will be detected.

The choice between a constant reference signal and a variable reference signal is left to the skilled person. Also, the skilled person can implement a method to choose between a constant and a variable reference signal depending on external variables, such as number of wheels, speed, road conditions, etc.

Also, the nature of the first reference signal (constant or variable) may be independent of the nature of the second reference signal. For instance, an embodiment may be that the first reference signal is a variable reference signal based on a wheel speed signal from a wheel speed sensor on a further wheel, while the second reference signal is a constant, or vice versa.

As possible implementation, there is provided a computer program product arranged to, when executed in a computing device, control a processor to perform any or all of the method steps or functions described herein.

Embodiments of computer program products with program code for performing the described methods include any machine-readable medium that is capable of storing or encoding the program code. The term "machine-readable medium" shall accordingly be taken to include, but not to be limited to, solid state memories, optical and magnetic storage media, and carrier wave signals. The program code may be machine code or another code which can be converted into machine code by compilation and/or interpretation, such as source code in a high-level programming language, such as C++, or in any other suitable imperative or functional programming language, or virtual-machine code. The computer program product may comprise a data carrier provided with the program code or other means devised to control or direct a data processing apparatus to perform the method in accordance with the description. A data processing apparatus running the method typically includes a central processing unit, data storage means and an I/O-interface for signals or parameter values.

In addition to the method embodiments described above with respect to FIGS. 2 to 4, systems embodiments are disclosed. A system embodiment according to the teaching of the invention is typically capable to perform one or several of the method embodiments. A system embodiment is configured to obtain a wheel speed signal t(n) indicative of a wheel speed of a wheel of a vehicle, configured to determine a first detection signal on the basis of the wheel speed signal t(n) and a first reference signal, configured to determine a first detection signal on the basis of the wheel speed signal t(n) and a second reference signal, and configured to determine that the wheel of the vehicle is a loose wheel if at least one of the following conditions is met: (a) the first detection signal exceeds a first detection threshold, or (b) the second detection signal exceeds a second detection threshold.

What is claimed is:

1. A method of detecting a loose wheel of a vehicle, comprising:
    obtaining a wheel speed signal t(n) from a wheel sensor selected from the group consisting of magnetic wheel sensors and optical wheel sensors indicative of a wheel speed of a wheel of a vehicle,
    determining a first detection signal on the basis of the wheel speed signal t(n) and a first reference signal, wherein determining the first detection signal comprises estimating an imperfection signal $\hat{\delta}_1$ from the wheel speed signal t(n), which imperfection signal $\hat{\delta}_1$ being indicative of an imperfection of the wheel speed signal t(n) as compared to the actual wheel speed of the wheel of the vehicle,
    determining a second detection signal on the basis of the wheel speed signal t(n) and a second reference signal,
    determining that the wheel of the vehicle is a loose wheel if at least one of the following conditions is met:
        the first detection signal exceeds a first detection threshold,
        the second detection signal exceeds a second detection threshold.

2. The method of claim 1, wherein
    the wheel speed signal t(n) is obtained from a wheel speed sensor comprising the wheel sensor sensing the wheel speed of the wheel of the vehicle, and
    estimating the imperfection signal $\hat{\delta}_1$ comprises estimating a sensor imperfection value $\hat{\delta}_1$ indicative of the sensor imperfection of the wheel speed sensor.

3. The method of claim 2, wherein the sensor imperfection value $\hat{\delta}_1$ is a weighted average of sensor imperfection values y(n) of previous and current revolutions n of a rotary element of the wheel speed sensor.

4. The method of claims 3, wherein estimating the imperfection signal $\hat{\delta}_1$ comprises a step of low pass filtering according to the following filter relation:

$$LP: \hat{\delta}_l = (1-\mu)\hat{\delta}_l + \mu y(n), \text{ wherein}$$

$$y(n) = \frac{2\pi}{T_{LAP}(n)}(t(n) - t(n-1)) - \frac{2\pi}{L},$$

wherein $\hat{\delta}_1$ is an estimation value of the sensor imperfection, µ is a forgetting factor of the filter, t(n) and t(n−1) is the wheel speed signal, L is the total number of teeth of the rotary element and $T_{LAP}(n)$ is the duration of a complete revolution of the rotary element (5).

5. The method of claim 1, wherein determining the first detection signal comprises determining an imperfection-corrected wheel speed signal ε(n) from the wheel speed signal t(n) and the imperfection signal $\hat{\delta}_1$.

6. The method of claim 1, wherein determining the first detection signal comprises at least one of the following:
   computing a first variance within a finite time window,
   computing a difference to the first reference signal,
   computing a first cumulative sum according to the following relation:

CUSUMCounter(n+1)=min(max(CUSUMCounter(n)+α(n)−Drift,0),CounterLim it), wherein Drift and CounterLim it are tuning parameters.

7. The method of claim 1, wherein computing the second detection signal comprises at least one of the following:
   band pass filtering the wheel speed signal,
   computing a second variance within a finite time window,
   computing a difference to the second reference signal,
   computing a second cumulative sum according to the following relation:

CUSUMCounter(n+1)=min(max(CUSUMCounter(n)+α(n)−Drift,0),CounterLim it), wherein Drift and CounterLim it are tuning parameters.

8. The method of claim 1, wherein at least one of the first or second reference signals is a constant.

9. The method of claim 1, wherein at least one of the first or second reference signals is determined on the basis of a wheel speed signal indicative of a wheel speed of a further wheel of a vehicle.

10. A non-transitory computer program product including program code configured to, when executed in a computing device, carry out a method of detecting a loose wheel of a vehicle, comprising:
    obtaining a wheel speed signal t(n) from a wheel sensor selected from the group consisting of magnetic wheel sensors and optical wheel sensors indicative of a wheel speed of a wheel of a vehicle,
    determining a first detection signal on the basis of the wheel speed signal t(n) and a first reference signal, wherein determining the first detection signal comprises estimating an imperfection signal $\hat{\delta}_1$ from the wheel speed signal t(n), which imperfection signal $\hat{\delta}_1$ being indicative of an imperfection of the wheel speed signal t(n) as compared to the actual wheel speed of the wheel of the vehicle,
    determining a second detection signal on the basis of the wheel speed signal t(n) and a second reference signal,
    determining that the wheel of the vehicle is a loose wheel if at least one of the following conditions is met:
       the first detection signal exceeds a first detection threshold,
       the second detection signal exceeds a second detection threshold.

11. A system to detect a loose wheel, comprising a processing unit, the processing unit configured to
    obtain a wheel speed signal t(n) from a wheel sensor selected from the group consisting of magnetic wheel sensors and optical wheel sensors indicative of a wheel speed of a wheel of a vehicle,
    determine a first detection signal on the basis of the wheel speed signal t(n) and a first reference signal,
    determine a first detection signal on the basis of the wheel speed signal t(n) and a second reference signal,
    determine that the wheel of the vehicle is a loose wheel if at least one of the following conditions is met:
       the first detection signal exceeds a first detection threshold,
       the second detection signal exceeds a second detection threshold;
    wherein the processing unit comprises at least one of the following:
       an imperfection estimation section, configured to obtain the wheel speed sensor signal, the imperfection estimation section being configured to estimate an imperfection signal $\hat{\delta}_1$ from the wheel speed signal t(n), which imperfection signal $\hat{\delta}_1$ being indicative of an imperfection of the wheel speed signal t(n) as compared to the actual wheel speed of the wheel of the vehicle,
       an imperfection signal correction section,
       a band pass filter, configured to obtain the wheel speed sensor signal,
       a variance computing section,
       a cumulative sum determining section,
       a decision section, configured to determine the presence or absence of a loose wheel.

12. The system according to claim 11, wherein the system further comprises a wheel speed sensor comprising the wheel sensor for sensing the wheel speed of the wheel of the vehicle.

* * * * *